US008687134B2

(12) United States Patent
Hirosawa

(10) Patent No.: US 8,687,134 B2
(45) Date of Patent: Apr. 1, 2014

(54) LIQUID CRYSTAL DISPLAY DEVICE

(71) Applicant: Japan Display Inc., Minato-ku (JP)

(72) Inventor: Jin Hirosawa, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/961,276

(22) Filed: Aug. 7, 2013

(65) Prior Publication Data

US 2013/0321729 A1 Dec. 5, 2013

Related U.S. Application Data

(62) Division of application No. 13/074,463, filed on Mar. 29, 2011, now Pat. No. 8,542,329.

(30) Foreign Application Priority Data

Mar. 29, 2010 (JP) .................................. 2010-75995

(51) Int. Cl.
 *G02F 1/1343* (2006.01)
(52) U.S. Cl.
 USPC .......................................................... 349/39
(58) Field of Classification Search
 USPC .......................................................... 349/39
 See application file for complete search history.

(56) References Cited

U.S. PATENT DOCUMENTS

| 6,266,116 B1 | 7/2001 | Ohta et al. |
| 2001/0010575 A1 | 8/2001 | Yoshida et al. |
| 2004/0165136 A1 | 8/2004 | Sugiyama et al. |
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |

FOREIGN PATENT DOCUMENTS

| JP | 6-222397 | 8/1994 |
| JP | 7-92459 | 4/1995 |
| JP | 7-159807 | 6/1995 |
| JP | 9-105908 | 4/1997 |
| JP | 10-090708 | 4/1997 |
| JP | 9-160041 | 6/1997 |
| JP | 9-160042 | 6/1997 |
| JP | 9-160061 | 6/1997 |

(Continued)

OTHER PUBLICATIONS

Japanese Office Action issued Feb. 7, 2012, in Patent Application No. 2010-075995 (English Translation only).

*Primary Examiner* — Timothy L Rude
(74) *Attorney, Agent, or Firm* — Oblon, Spivak, McClelland, Maier & Neustadt, L.L.P.

(57) ABSTRACT

In one embodiment, a liquid crystal display device includes a first substrate having a pixel electrode and a second substrate having a counter electrode. The pixel electrode includes a first pixel electrode portion in a belt-like shape extending in a first direction and a second pixel electrode portion connected with one end of the first pixel electrode portion and extending in a second direction orthogonally crossing the first direction. The counter electrode includes a first counter electrode portion in a belt-like shape extending in the first direction to form a lateral electric field between the first counter electrode portion and the first pixel electrode portion. A liquid crystal layer is held between the first substrate and the second substrate. The lateral electric field is applied to the liquid crystal layer.

13 Claims, 6 Drawing Sheets

(56) References Cited

FOREIGN PATENT DOCUMENTS

| JP | 10-026765 | 1/1998 |
|----|-----------|--------|
| JP | 10-48671 | 2/1998 |
| JP | 11-258624 | 9/1999 |
| JP | 2000-81641 | 3/2000 |
| JP | 2001-235744 | 8/2001 |
| JP | 2002-131780 | 5/2002 |
| JP | 2005-3802 | 1/2005 |
| JP | 3644653 | 2/2005 |
| JP | 2005-242307 | 9/2005 |

LIQUID CRYSTAL DISPLAY DEVICE

CROSS-REFERENCE TO RELATED APPLICATION

This application is a divisional of U.S. application Ser. No. 13/074,463, filed Mar. 29, 2011, which is based upon and claims the benefit of priority from Japanese Patent Application No. 2010-75995, filed Mar. 29, 2010, the entire contents of each of which are incorporated herein by reference.

FIELD

The present invention relates to a liquid crystal display device and more particularly a liquid crystal display device using lateral electric field.

BACKGROUND

In recent years, a flat display is actively developed, and especially the liquid crystal display device attracts attention from advantages, such as lightness, compactness and low power consumption. Especially, in an active matrix type liquid crystal display device including a switching element in each pixel, the structure using lateral electric field, such as IPS (In-Plane Switching) mode and FFS (Fringe Field Switching) mode, attracts attention. For example, refer to Japanese laid open patent application Nos. P2002-131780 and P2005-3802. The liquid crystal display devices in the lateral electric field modes, such as the IPS, FFS modes etc., are equipped with a pixel electrode and a common electrode formed in an array substrate. A switching transistor formed on the array substrate switches a liquid crystal molecule by applying lateral electric field approximately in parallel to the principal surface of the array substrate. Moreover, a pair of polarizing plates arranged so that respective polarizing axis cross orthogonally are formed on the respective external surfaces of the array substrate and the counter substrate. By arrangement of such polarizing plates, a black image is displayed, for example, at the time when no voltage is impressed, and when the voltage corresponding to an image signal is applied to the pixel electrode, transmissivity (modulation rate) increases gradually and a white image is displayed. In such liquid crystal display device, since liquid crystal molecule rotates within a plane approximately in parallel to the principal surface of the substrates, the polarized state is not influenced greatly by the incidence direction of penetrating light. Furthermore, the liquid crystal display device has features that dependency on viewing angle is small, and the viewing angle is wide.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
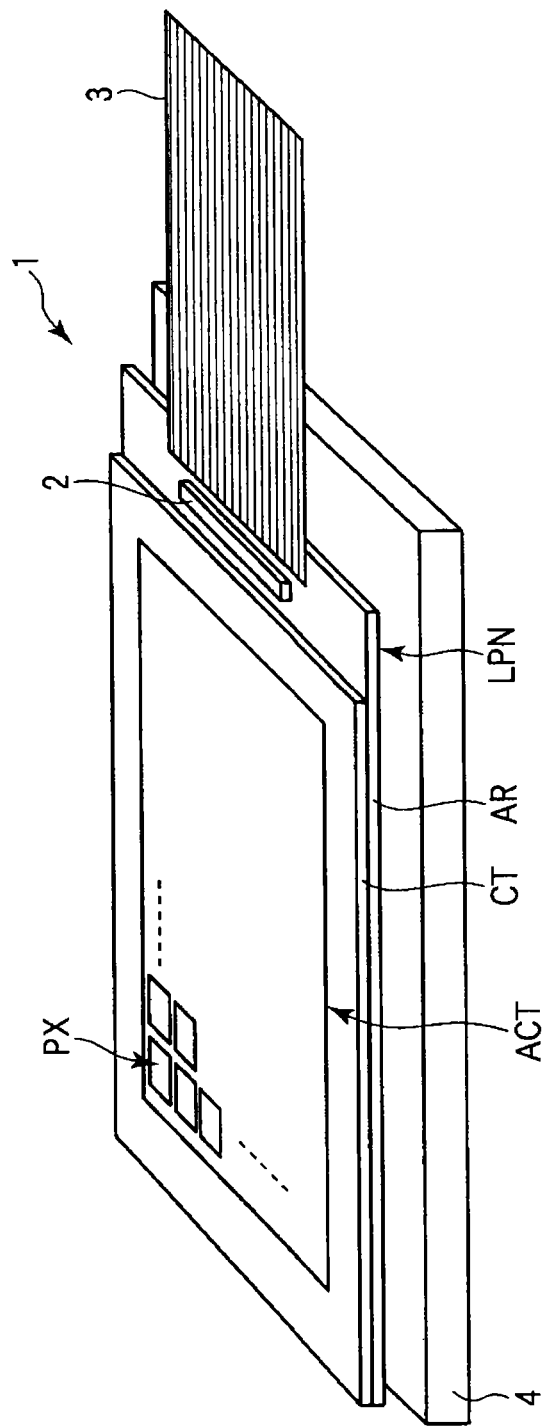
FIG. 1 is a view schematically showing a liquid crystal display device according to an embodiment of the present invention.

A liquid display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate having a pixel electrode formed thereon, the pixel electrode including a first pixel electrode portion in a belt-like shape extending in a first direction and a second pixel electrode portion connected with one end of the first pixel electrode portion and extending in a second direction orthogonally crossing the first direction; a second substrate having a counter electrode formed thereon and facing the first substrate, the counter electrode including a first counter electrode portion in a belt-like shape extending in the first direction to form a lateral electric field between the first counter electrode portion and the first pixel electrode portion; and a liquid crystal layer held between the first substrate and the second substrate.

Hereafter, one embodiment of the present invention is explained in detail referring to drawings. FIG. 1 is a figure schematically showing the composition of the liquid crystal display device in the embodiment.

That is, the liquid crystal display device 1 is equipped with a liquid crystal display panel LPN of an active-matrix type, a driving IC chip 2 connected to the liquid crystal display panel LPN, a flexible wiring substrate 3 and a back light 4 to illuminate the liquid crystal display panel LPN.

The liquid crystal display panel LPN includes an array substrate AR as a first substrate, a counter substrate CT as a second substrate arranged opposing to the array substrate AR and a liquid crystal layer (which is not shown) held between the array substrate AR and the counter substrate CT. Such liquid crystal display panel LPN includes an active area ACT to display an image. The active area ACT is configured by a plurality of pixels PX arranged in the shape of an (m×n) matrix (here, "m" and "n" are positive integers).

The back light 4 is arranged at the back side of the array substrate AR in the illustrated example. Various forms can be applied as the back light 4, and a light emitting diode (LED) and a cold cathode pipe (CCFL), etc., are used as a light source. The explanation regarding the detailed structure of the back light 4 is omitted.

Figure 2:
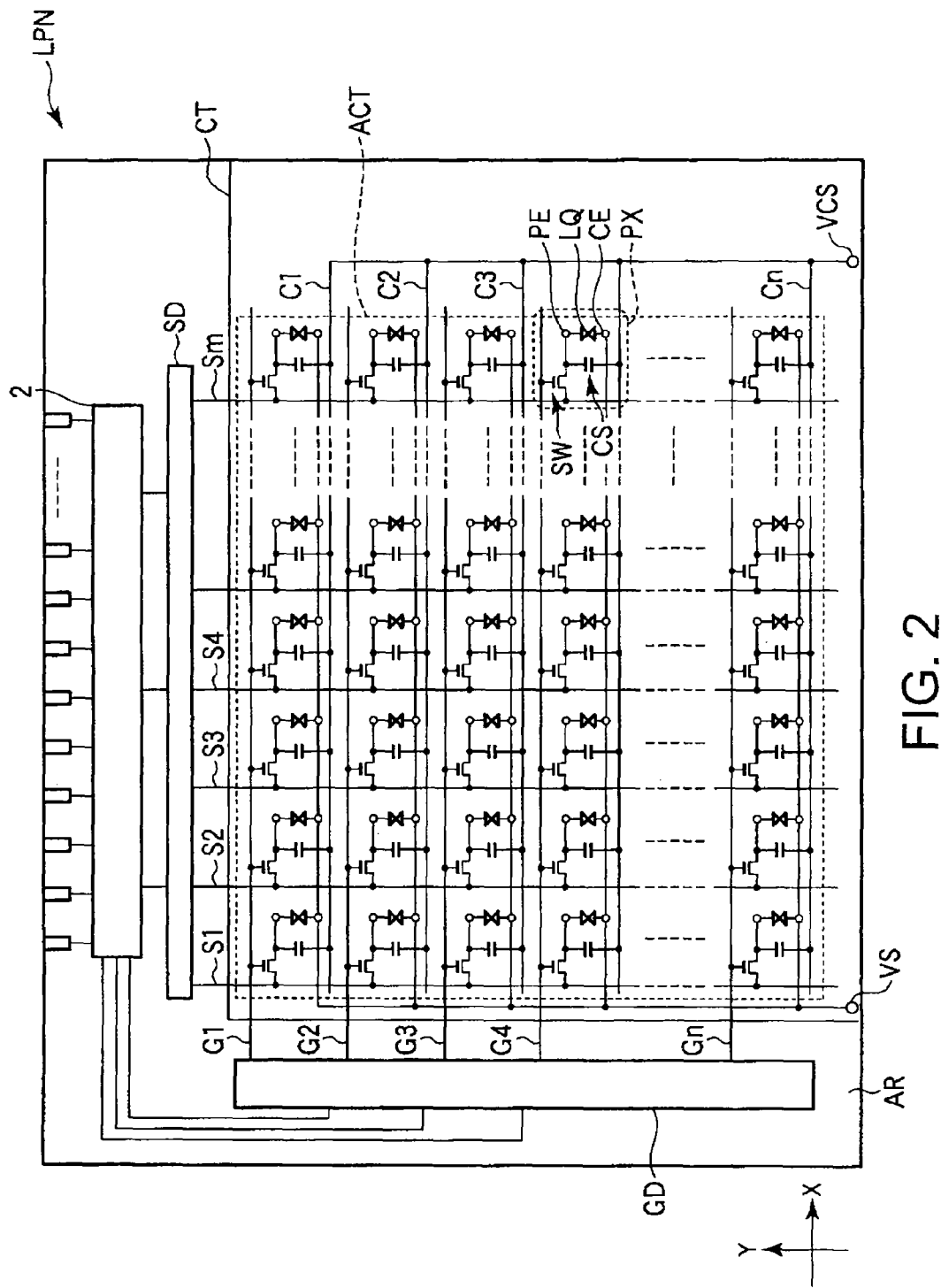
FIG. 2 is a view showing a structure and an equivalent circuit of the liquid crystal display device shown in FIG. 1.

FIG. 2 is a view showing a structure and an equivalent circuit of the liquid crystal display panel LPN shown in FIG. 1. The liquid crystal display panel LPN includes n gate lines G (G1-Gn), n auxiliary capacitance lines C (C1-Cn), m source lines S (S1-Sm). The gate lines G and the auxiliary capacitance lines C respectively extend in a X direction, and the gate lines G and the auxiliary capacitance lines C are respectively arranged in parallel and in turns in a Y direction which crosses the X direction. The source lines S extend in the Y direction which crosses the gate lines G and the auxiliary capacitance lines C. The source lines S are respectively arranged in parallel in the X direction. That is, the gate lines G and the auxiliary capacitance lines C cross the source lines orthogonally.

Each gate line G is pulled out to the outside of the active area ACT and is connected to a gate driver circuit GD. Each source line S is pulled out to the outside of the active area ACT and is connected to a source driver circuit SD. At least one of the gate driver GD and source driver SD is formed in the array substrate AR and is connected with the driving IC chip 2 which is equipped with a controller, for example.

Each pixel PX includes a switching element SW, a pixel electrode PE, a counter electrode CE, etc. Retention capacitance Cs is formed, for example, between the auxiliary capacitance line C and the pixel electrode PE.

In this embodiment, the liquid crystal display panel LPN is configured so that the pixel electrode PE is formed on the array substrate AR, while the counter electrode CE is formed on the counter substrate CT. The liquid crystal molecule which forms the liquid crystal layer LQ is switched mainly using electric field formed between the pixel electrode PE and the counter electrode CE. The electric field formed between the pixel electrode PE and the counter electrode CE is lateral electric field approximately parallel to the principal surface of the array substrate AR and the principal surface of the counter substrate CT.

The switching element SW is configured by an n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The counter electrode CE is set to common potential, for example, and is formed in common to a plurality of pixel electrodes PE through the liquid crystal layer LQ. The counter electrode CE is electrically connected with an electric power supply portion VS formed in the array substrate AR through an electric conductive element which is not illustrated. The auxiliary capacitance line C is electrically connected with a voltage applied portion VCS to which the auxiliary capacitance voltage is applied.

Figure 3:
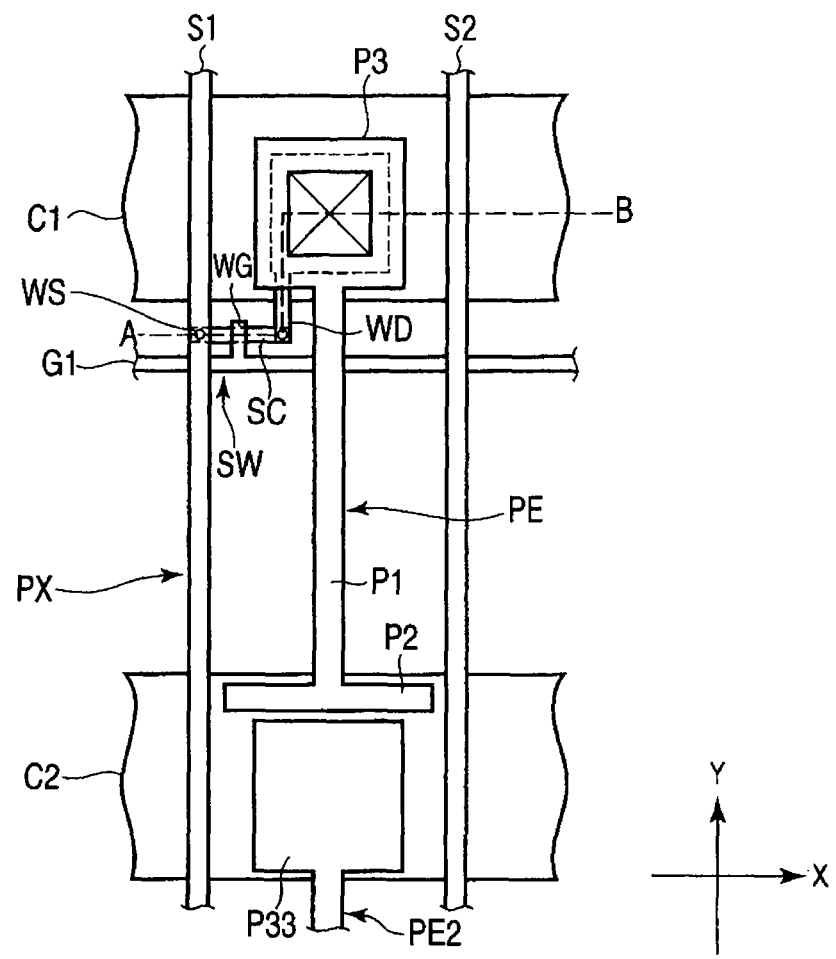
FIG. 3 is a plan view schematically showing a structure of a pixel in an array substrate shown in FIG. 2.

FIG. 3 is a schematic plan view of the structure of the pixel PX in the array substrate AR shown in FIG. 2 looked from the counter substrate CT side.

The gate line G1 and the auxiliary capacitance lines C1, C2 respectively extend in the direction X. The source lines S1 and S2 are located in the both sides which sandwich the pixel electrode PE, and extend in the Y direction respectively. In the illustrated example, the gate line G1 is located between the auxiliary capacitance line C1 and the auxiliary capacitance line C2, and a grid portion formed of the auxiliary capacitance lines C1 and C2 and the source line S1 and S2 corresponds to an aperture portion of the pixel PX.

The switching element SW is arranged near an intersection area where the gate line G and source line S cross. The switching element SW includes a semiconductor layer SC. The semiconductor layer SC is formed of poly-silicon, an amorphous silicon, etc. Here, the switching element SW is formed with poly-silicon.

The gate electrode WG of the switching element SW is located on the semiconductor layer SC and is electrically connected with the gate line G1. In the illustrated example, the gate electrode WG is formed integrally with the gate line G1. A source electrode WS of the switching element SW is electrically connected with the source line S1. In the illustrated example, the source electrode WS is formed integrally with the source line S1. A drain electrode WD of the switching element SW extends on the auxiliary capacitance line C1.

The pixel electrode PE includes a first pixel electrode portion P1, a second pixel electrode portion P2 and a third pixel electrode portion P3. Although only the pixel electrode PE arranged in the pixel PX and a portion of a pixel electrode PE2 which adjoins the pixel PX in the Y direction (downside in figure) are illustrated in the illustrated example, the pixel electrodes of the same pattern are arranged in other pixels which are omitted to be illustrated.

Namely, the first pixel electrode portion P1 is formed in a belt-like shape extending linearly in the Y direction. The first pixel electrode portion P1 is located approximately in the center between the source line S1 and the adjoining source line S2. The second pixel electrode portion P2 is connected to an end portion of the first pixel electrode portion P1 and extends in a different direction from the first pixel electrode portion P1. In the illustrated example, the second pixel electrode portion P2 linearly extends in the Y direction forming a T character shape with the first pixel electrode portion P1. The third pixel electrode portion P3 is connected with the other end portion of the first pixel electrode portion P1 and is formed in an approximately square form. The length of the third pixel electrode portion P3 in the X direction is shorter than the length in the X direction of the second pixel electrode portion P2.

The third pixel electrode portion P3 is located on the auxiliary capacitance line C1 through an insulating film which is not illustrated. The third pixel electrode portion P3 is electrically connected with the drain electrode WD and extending on the auxiliary capacitance line C1. Thereby, the pixel electrode PE is electrically connected with the switching element SW. Moreover, a retention capacitance Cs is formed between the pixel electrode PE and the auxiliary capacitance line C1.

The second pixel electrode portion P2 is located above the auxiliary capacitance line C2 through an insulating film which is not illustrated. A third pixel electrode portion P33 of the pixel electrode PE2 adjoining the pixel PX in the downside in the Y direction is also located above the auxiliary capacitance line C2. The second pixel electrode portion P2 is arranged apart from the third pixel electrode portion P33 while facing the third pixel electrode portion P33.

Figure 4:
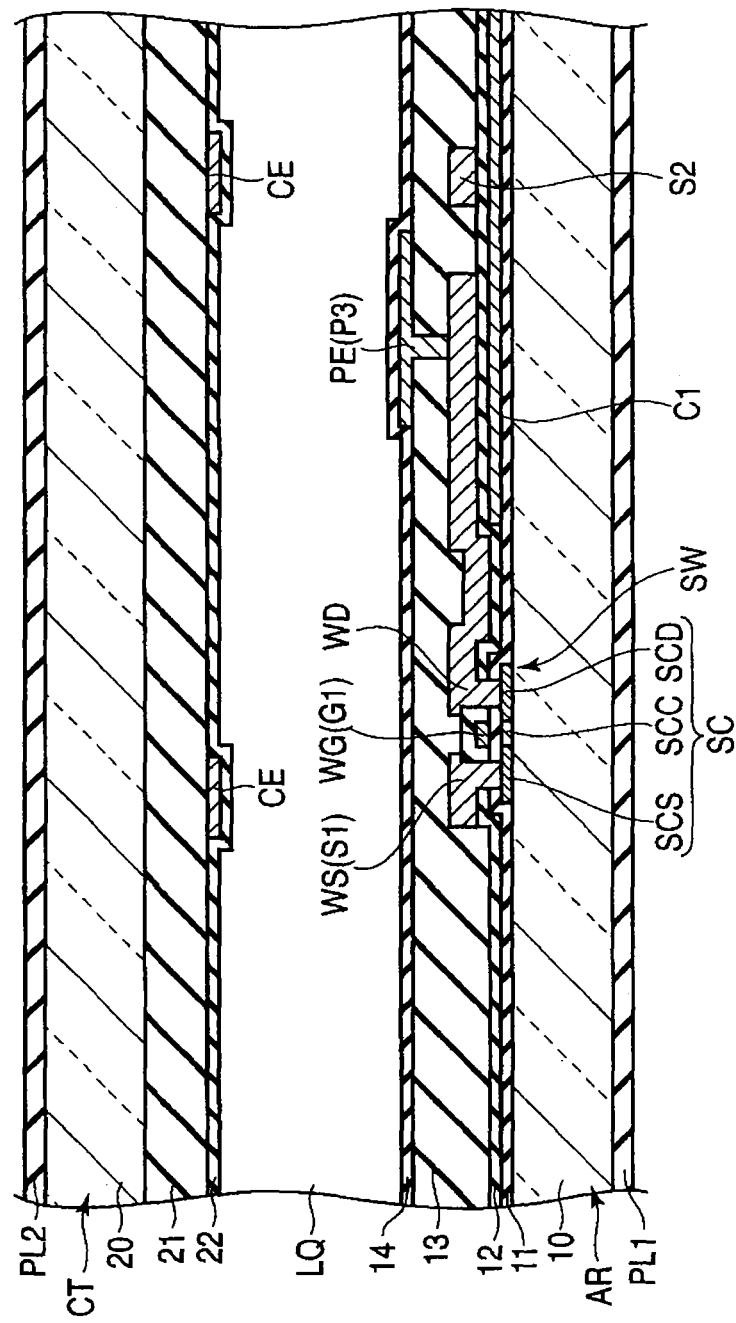
FIG. 4 is a cross-sectional view schematically showing a structure of a liquid crystal panel shown in FIG. 3 taken along line A-B.

FIG. 4 is a cross-sectional figure schematically showing the structure of the liquid crystal display panel LPN taken along line A-B of the pixel PX shown in FIG. 3. That is, the array substrate AR is formed using a first insulating substrate 10 such as a glass substrate with light transmissivity. The array substrate AR includes the switching element SW in the inside (namely, surface facing the liquid crystal layer LQ) of the first insulating substrate 10. The switching element SW shown here is a thin film transistor of a top gate type.

The semiconductor layer SC of the switching element SW is formed on the first insulating substrate 10. The semiconductor layer SC has a source region SCS and a drain region SCD respectively on both sides which sandwich the channel region SCC. In addition, an under coat layer formed of an insulating film may be arranged between the first insulating substrate 10 and the semiconductor layer SC. The semiconductor layer SC is covered with a gate insulating film 11. Moreover, the gate insulating film 11 is also arranged on the first insulating substrate 10.

The gate electrode WG is formed on the gate insulating film 11 and is located above the channel region SCC of the semiconductor layer SC. The auxiliary capacitance line C1 is formed on the gate insulating film 11. The gate electrode WG and the auxiliary capacitance line C1 can be formed in the same process using the same material as the gate line G, the auxiliary capacitance line C2, etc., which are not illustrated.

The gate electrode WG and the auxiliary capacitance line C1 are covered with the first interlayer insulating film 12. Moreover, the first interlayer insulating film 12 is arranged also on the gate insulating film 11. The gate insulating film 11 and first interlayer insulating film 12 are formed of inorganic system materials, such as oxidization silicon and nitride silicon, for example.

The source electrode WS and drain electrode WD of the switching element SW are formed on the first interlayer insulating film 12. The source electrode WS is a part of the source line 51. Moreover, in this figure, the source line S2 formed on the first interlayer insulating film 12 is also illustrated. The source electrode WS, the drain electrode WD, and the source lines S1 and S2 can be formed at the same process using the same material.

The source electrode WS is in contact with the source region SCS of the semiconductor layer SC through a contact hole which penetrates the gate insulating film 11 and the first interlayer insulating film 12. The drain electrode WD is in contact with the drain region SCD of the semiconductor layer SC through a contact hole which penetrates the gate insulating film 11 and the first interlayer insulating film 12. Moreover, the drain electrode WD extends on the auxiliary capacitance line C1. The gate electrodes WG, source electrode WS, and drain electrode WD are formed of electric conductive materials, such as molybdenum, aluminum, tungsten, and titanium, for example.

The switching element SW composed as above is covered with a second interlayer insulating film 13. That is, the source electrode WS, the drain electrode WD, and the source lines S1 and S2 are covered with the second interlayer insulating film 13. Moreover, the second interlayer insulating film 13 is also arranged on the first interlayer insulating film 12. The second interlayer insulating film 13 is formed of various organic materials, such as ultraviolet curing type resin and heat hardening type resin, for example.

The pixel electrode PE is formed on the second interlayer insulating film 13. In the illustrated example, the third pixel electrode portion P3 of the pixel electrode PE is located above the auxiliary capacitance line C1 and is connected with the drain electrode WD through a contact hole which penetrates the second interlayer insulating film 13. Although such pixel electrode PE is formed of electrical conductive material with light transmissivity, for example, Indium Tin Oxide (ITO), Indium Zinc Oxide (IZO), etc., the pixel electrode PE may be formed of other metal materials, such as aluminum.

The pixel electrode PE is covered with a first alignment film 14. The first alignment film 14 is arranged also on the second interlayer insulating film 13 and is provided in a surface which contacts with the liquid crystal layer LQ of the array substrate AR. The first alignment film 14 is formed of the material which shows a horizontal alignment characteristic, and a rubbing processing is carried out.

On the other hand, the counter substrate CT is formed using a second insulating substrate 20 with the light transmissivity, such as a glass substrate. The counter substrate CT includes a color filter layer 21, the counter electrode CE, etc., in the inside surface (namely, surface facing the liquid crystal layer LQ) of the second insulating substrate 20.

The color filter layer 21 is formed on the second insulating substrate 20. The color filter layer 21 is formed of resin material colored with several mutually different colors, for example, three primary colors of red, blue, and green. Although not explained in full detail, the resin material colored red is arranged corresponding to a red pixel, the resin material colored blue is similarly arranged corresponding to a blue pixel, and the resin material colored green is arranged corresponding to a green pixel.

The counter electrode CE is formed on the color filter layer 21. The counter electrode CE is arranged so that lateral electric field is formed between the counter electrode CE and the pixel electrodes PE. In the illustrated example, the counter electrode CE is located above the source lines S1 and S2. Although such counter electrode CE is formed of the electric conductive material with light transmissive characteristics such as ITO and IZO, the counter electrode CE may be formed of other metal materials, such as aluminum.

The surface of the counter electrode CE is covered with a second alignment film 22. The second alignment film 22 is arranged also on the color filter layer 31 and is provided on the surface which contacts with the liquid crystal layer LQ of the counter substrate CT. The second alignment film 22 is formed of the material which shows horizontal alignment characteristics like the first alignment film 14, and rubbing processing is carried out.

In addition, in the counter substrate CT, an overcoat layer which makes unevenness of the surface of the color filter layer 21 flat may be arranged between the color filter layer 21, and the counter electrode CE and the second alignment film 22.

The array substrate AR and the counter substrate CT as mentioned-above are arranged so that the respective first alignment film 14 and second alignment film 22 may face each other. At this time, a pillar-shaped spacer integrally formed by resin material with one of the substrates is arranged between the first alignment film 14 of the array substrate AR and the second alignment film 22 of the counter substrate CT. Thereby, a predetermined gap, for example, 3-7 micrometer cell gap, is formed. The array substrate AR and the counter substrate CT are attached together by seal material (which is not illustrated) in a state where the predetermined cell gap is formed.

The liquid crystal material is injected into the cell gap mentioned above. That is, the liquid crystal layer LQ is formed of the liquid crystal material held between the array substrate AR and the counter substrate CT.

The first polarizing plate PL1 is attached on one external surface of the liquid crystal display panel LPN, that is, the external surface of the first insulating substrate 10 which composes the array substrate AR by adhesives, etc. Moreover, the second polarizing plate PL2 is attached on the external surface of another side of the liquid crystal display panel LPN, that is, the external surface of the second insulating substrate 20 which composes the counter substrate CT by adhesives etc.

In this embodiment, a linear polarization mode is adopted. The first and second polarizing plates PL1 and PL2 are arranged so that the respective absorption axis of the first polarizing plate PL1 and the absorption axis of the second polarizing plate PL2 cross at right angles. The linearly polarized light selectively penetrates the polarizing plates, and an image is displayed.

Figure 5:
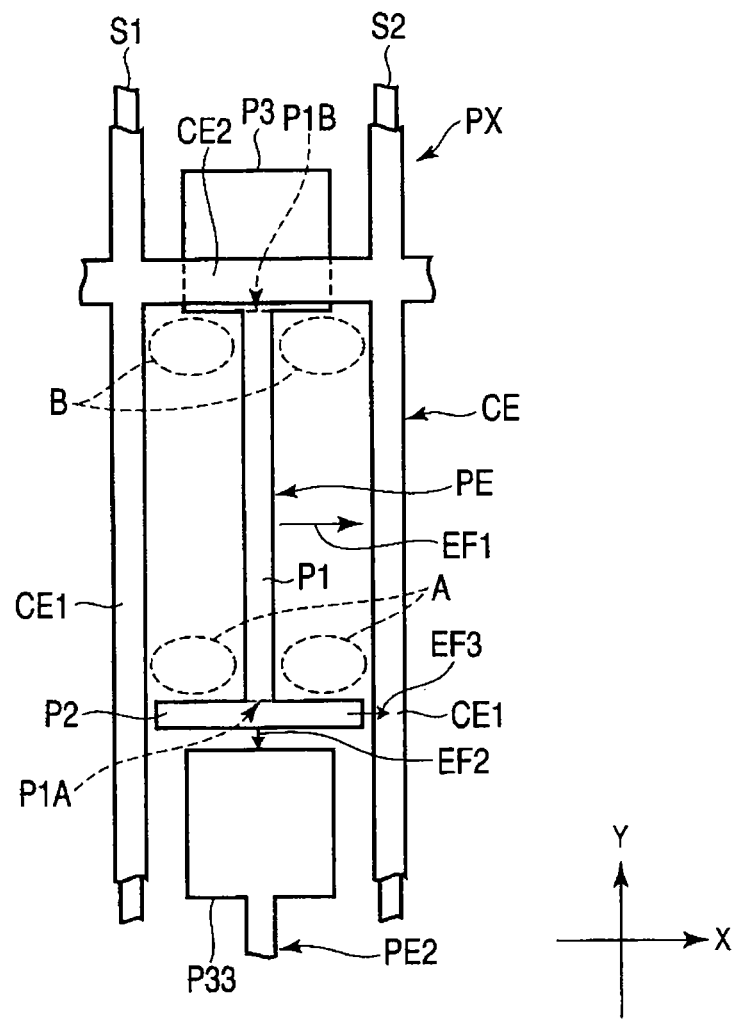
FIG. 5 is a plane view schematically showing a main portion of the pixel of the liquid crystal display panel according to the embodiment.

FIG. 5 is a plane view schematically showing a main portion of a pixel of the liquid crystal display panel LPN according to the embodiment. The pixel electrode PE is located between adjacent two source lines, here S1 and S2 as mentioned-above, and includes the first pixel electrode portion P1, the second pixel electrode portion P2, and the third pixel electrode portion P3. A third pixel electrode portion P33 of adjoining pixel electrode PE2 is located in the downside of the second pixel electrode portion P2 in the figure.

The counter electrode CE includes a first counter electrode portion CE1 formed in a belt-like shape in parallel with the first pixel electrode portion P1. The first counter electrode portion CE1 is arranged so that lateral electric field may be formed between the first pixel electrode portion P1 and first counter electrode portion CE1. The first counter electrode portion CE1 extends in the Y direction and is located above the source lines S1 and S2. Moreover, the counter electrode CE includes a second counter electrode portion CE2 connected with the first counter electrode portion CE1. The second counter electrode portion CE2 extends in the X direction and is located above the third pixel electrode portion P3 of the pixel electrode PE.

Although illustration is omitted, since the rubbing processing of the first and second alignment films that cover the counter electrode CE and the pixel electrode PE respectively is carried out, the liquid crystal molecule is aligned with a predetermined direction in the X-Y plane, for example, the direction parallel to the Y direction by an interaction between the first alignment film 14 and the second alignment film 22.

Thus, the direction of the alignment of the liquid crystal molecule in the state where potential difference is not formed between the pixel electrode PE and the counter electrode CE is called an initial alignment direction. In this embodiment, in the state where the liquid crystal molecule is aligned in the initial alignment direction, the light irradiated toward the liquid crystal display panel LPN from the back light 4 cannot penetrate the second polarizing plate PL2. Therefore, a normally black mode to form a black screen is formed.

When potential difference is formed between the pixel electrode PE and the counter electrode CE, the lateral electric field parallel to the X-Y plane is formed. Especially, the lateral electric field EF1 parallel to the X direction is formed between the first pixel electrode portion P1 and first counter electrode portion CE1. At this time, the liquid crystal molecule is aligned to a different direction from the initial alignment direction mainly under the influence of the lateral electric field EF1. In such state, the light irradiated toward the liquid crystal display panel LPN from the back light 4 penetrates the second polarizing plate PL2, and a white screen is displayed.

In this embodiment, when a line inversion driving method is applied, the polarity of the voltage impressed to the pixel electrode PE becomes opposite the polarity of the voltage impressed to the pixel electrode PE2 adjoining the pixel electrode PE with reference to the potential of the counter electrode CE. For example, when potential of the counter electrode CE is set to 0V, the voltage impressed to the pixel electrode PE is +5V, and the voltage impressed to pixel electrode PE2 is −5V, a strong lateral electric field EF2 is formed by the potential difference between the pixel electrode PE and pixel electrode PE2. The direction of the lateral electric field EF2 is influenced by the form of the pixel electrode PE which faces the pixel electrode PE2, and the form of the pixel electrode PE2 which faces the pixel electrode PE.

In case the pixel electrode PE is not provided with the second pixel electrode portion P2, one end portion P1A of the first pixel electrode portion P1 faces the third pixel electrode portion P33 of the pixel electrode PE2. At this time, the length of the end portion P1A in the X direction is shorter than that of the third pixel electrode portion P33 in the X direction. Therefore, in the portion where the end portion P1A faces the third pixel electrode portion P33, lateral electric field EF2 is formed in the Y direction while lateral electric field EF1 approximately in the Y direction is formed between the first pixel electrode portion P1 and first counter electrode portion CE1.

In a circumference region A of one end portion P1A of the first pixel electrode portion P1, the direction of the lateral electric field continuously changes from the direction of lateral electric field EF1 to the direction of lateral electric field EF2. Therefore, the alignment state of the liquid crystal molecule located in the region A also changes continuously in response to the influence of the lateral electric field. In the liquid crystal display panel LPN adopting the linear polarization mode, a dark line is generated by the existence of a liquid crystal molecule aligned approximately in parallel with the absorption axis of the first polarizing plate PL1 and second polarizing plate PL2 in the X-Y plane. Specifically, the dark line occurs in the region A resulting in the reduction of transmissivity.

According to this embodiment, the pixel electrode PE includes a second pixel electrode portion P2 connected with one end portion P1A of the first pixel electrode portion P1. The second pixel electrode portion P2 faces the third pixel electrode portion P33 of the pixel electrode PE2. In the illustrated example, the second pixel electrode portion P2 forms a T character shape with the first pixel electrode portion P1.

Therefore, in the portion where the second pixel electrode portion P2 faces the third pixel electrode portion P33 of the pixel electrode PE2, lateral electric field EF2 is formed approximately in the Y direction while lateral electric field EF3 is formed approximately in the X direction between the second pixel electrode portion P2 and first counter electrode portion CE1. Thereby, in the region A, the liquid crystal molecule controlled and aligned by lateral electric field EF1 becomes dominant, and generation of the dark line can be suppressed. Accordingly, it becomes possible to raise the transmissivity as compared with the case where the pixel electrode PE is not provided with the second pixel electrode portion P2.

The region where the dark line is generated shifts to the auxiliary capacitance line C2 side (which is not shown), in which the second pixel electrode portion P2 and the third pixel electrode portion P33 are located. Since the auxiliary capacitance line C2 is formed of the electric conductive material with the light blocking characteristics, even if the dark line shifts to the auxiliary capacitance line side, the dark line hardly affects the transmissivity of the pixel PX.

Moreover, according to this embodiment, the length of the second pixel electrode portion P2 in the X direction is longer than the length of the third pixel electrode portion P33 in the X direction. Therefore, the effect to shield the influence of lateral electric field EF2 increases, and it becomes possible to suppress the generation of the dark line more.

Even if it is in the state where potential difference is formed between the pixel electrode PE and the counter electrode CE, the liquid crystal molecule located corresponding to the first pixel electrode portion P1 or the first counter electrode portion CE1 is not aligned in the direction which contributes to the display in many cases. In this embodiment, the first counter electrode portion CE1 is located above the source lines S1 and S2 (that is, position which faces the source line S1 and S2). Since the source line S is formed of the electric conductive material with light blocking characteristics, even if the liquid crystal molecule of the region which overlaps with first counter electrode portion CE1 is aligned to the direction which does not contribute to the display, the liquid crystal molecule hardly affects the transmissivity of the pixel PX. Rather, the transmissivity of the pixel PX is improved as compared with the case where the first counter electrode portion CE1 is arranged so as to close to the first pixel electrode portion P1 side rather than on the source lines S1 and S2. In the case of the illustrated example, the region between the source lines S1 and S2 and the first pixel electrode portion P1 serves as an aperture of the pixel PX, and turns into a region which contributes to the display, that is, to raise the transmissivity.

Moreover, it becomes possible to expand the distance between the first pixel electrode portion P1 and first counter electrode portion CE1 by arranging first counter electrode portion CE1 above the source lines S1 and S2, and it becomes possible to form lateral electric field EF1 which is more horizontal state. Therefore, the wide viewing angle, which is an original advantage of lateral electrical liquid crystal display device, such as IPS mode is also maintained.

In addition, when misalignment between the array substrate AR and the counter substrate CT arises in the manufacturing process, a distance difference may arise between the first pixel electrode portions P1 and a pair of first counter electrode portions CE1 of the both sides which sandwich the first pixel electrode portions P1. However, since such misalignment is produced in common with all pixel PXs, there is no difference in the electric field distribution among the respective pixel PXs, and the displayed images are not affected.

In the case the counter electrode CE does not have the second counter electrode portion CE2 in the circumference region B of the other end portion P1B of the first pixel electrode portion P1, a dark line occurs and reduction in transmissivity is caused by alignment disorder of the liquid crystal molecule.

According to this embodiment, the counter electrode CE includes the second counter electrode portion CE2 located right above the third pixel electrode portion P3. Accordingly, the vertical electrical field formed between the third pixel electrode portion P3 and the second counter electrode portion CE2, and the lateral electric field EF1 formed between the first pixel electrode portion P1 and first counter electrode portion CE1 interact mutually, and the alignment disorder of the liquid crystal molecule can be eased. Therefore, the generation of the dark line can be controlled. As a consequence, it becomes possible to improve the transmissivity compared with the case where the counter electrode CE does not have the second counter electrode portion CE2.

Hereinafter, a practical example according to the embodiment and comparative examples 1 and 2 are explained.

Practical Example

The pixel electrode PE formed in the array substrate AR includes the first pixel electrode portion P1 formed in the central portion between adjoining two source lines S, the second pixel electrode portion P2 formed at one end portion of the first pixel electrode portion P1, and the third pixel electrode portion P3 formed in the other end portion of the first pixel electrode portion P1. The width of the first pixel electrode portion P1 in the X direction is set to 10 micrometers. The counter electrode CE formed in the counter substrate CT includes a first counter electrode portion CE1 formed right above the source line S in parallel with the first pixel electrode portion P1, and the second counter electrode portion CE2 formed right above the third pixel electrode portion P3. The width of the first counter electrode portion CE1 in the X direction is set to 10 micrometers.

The first alignment film 14 is formed on the surface of the array substrate AR. Moreover, the second alignment film 22 is formed on the surface of the counter substrate CT. The first and second alignment films 14 and 22 are formed by carrying out the rubbing processing after painting the material with horizontal alignment characteristics by a thickness of 70 nm. The cell gap between array substrate AR and the counter substrate CT is set to 4.0 micrometers, and the array substrate AR and the counter substrate CT are attached together. The liquid crystal display panel LPN with a pixel pitch of 50 micrometers is produced by injecting positive type liquid crystal by Merck Co. between the array substrate AR and counter substrate CT. The example corresponds to the embodiment shown in FIG. 5.

Comparative Example 1

In this comparative example 1, the pixel electrode PE does not include the second pixel electrode portion P2. In addition, the counter electrode CE does not include the second counter electrode portion CE2. The liquid crystal display panel is produced like the above practical example other than the points.

Comparative Example 2

In this comparative example 2, the counter electrode CE does not include the second counter electrode portion CE2. The liquid crystal display panel LPN is produced like the case of the above practical example except for the point.

The transmissivity is measured about each liquid crystal display panel of the above-mentioned practical example, the comparative example 1, and the comparative example 2 by applying same potential difference between the pixel electrode PE and the counter electrode CE. When the transmissivity in the liquid crystal display panel LPN of the comparative example 1 is set to 1, the transmissivity in the liquid crystal display panel LPN of the comparative example 2 is 1.2, but the transmissivity in the liquid crystal display panel LPN of the practical example is 1.4. Therefore, it is confirmed that high transmissivity is achieved according to the embodiment.

Therefore, according to the embodiments, it becomes possible to provide the liquid crystal display device with high transmissivity and good display quality.

For example, the form of the pixel electrode PE is not limited to the example shown in FIG. 5, etc. In the example shown in FIG. 6, the pixel electrode PE includes the second pixel electrode portion P2 connected with the end portion of the first pixel electrode portion P1 and extending in two directions in which the second pixel electrode portion P2 extends in directions different from both the X and Y directions. The second pixel electrode portion P2 is formed in a Y character shape with the first pixel electrode portion P1.

Figure 6:
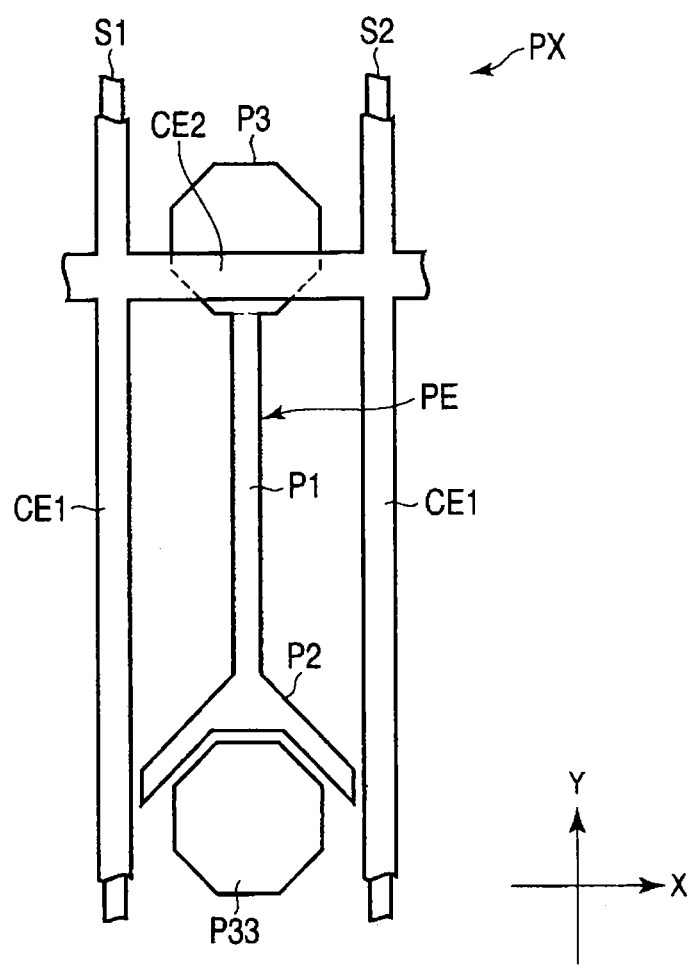
FIG. 6 is a view schematically showing a main portion of the liquid crystal display panel according to one modification of the embodiment.

Moreover, in the example shown in FIG. 6, the pixel electrode PE has the third pixel electrode portion P3 connected to the other end portion of the first pixel electrode portion P1. The third pixel electrode portion P3 faces the first pixel electrode portion P1 and is formed in an octagon shape.

In the pixel electrode PE of the example shown in FIG. 6, high transmissivity is attained like the above-mentioned embodiments.

While certain embodiments have been described, these embodiments have been presented by way of example only, and are not intended to limit the scope of the inventions. In practice, the structural elements can be modified without departing from the spirit of the invention. Various embodiments can be made by properly combining the structural elements disclosed in the embodiments. For example, some structural elements may be omitted from all the structural disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display device, comprising:
a first substrate having a pixel electrode formed thereon, the pixel electrode including a first pixel electrode portion in a belt-like shape extending in a first direction and a second pixel electrode portion connected with one end of the first pixel electrode portion and extending in a second direction orthogonally crossing the first direction;
a second substrate having a counter electrode formed thereon and facing the first substrate, the counter electrode including a first counter electrode portion in a belt-like shape extending in the first direction to form a lateral electric field between the first counter electrode portion and the first pixel electrode portion; and
a liquid crystal layer held between the first substrate and the second substrate, wherein the first substrate further comprises a first auxiliary capacitance line and a second auxiliary capacitance line respectively extending in the second direction,
the pixel electrode further includes a third pixel electrode portion arranged above the first auxiliary capacitance line and connected with the other end of the first pixel electrode portion,
the second pixel electrode portion is located above the second auxiliary capacitance line, and
wherein the second pixel electrode portion is formed in the shape of Y with the first pixel electrode portion.

2. The liquid crystal display device according to claim 1, wherein the first substrate includes gate lines extending in the second direction, and source lines extending in the first direction and located at both sides of the first pixel electrode portion, and the first counter electrode portion is arranged on the respective source lines.

3. The liquid crystal display device according to claim 2, wherein the pixel electrode further includes a third pixel electrode portion connected with the other end of the first pixel electrode portion, and the counter electrode further includes a second counter electrode portion extending in the second direction, the second counter electrode portion located above the third pixel electrode portion and connected with the first counter electrode portion.

4. The liquid crystal display device according to claim 3, wherein the third pixel electrode portion is formed in an octagon shape.

5. A liquid crystal display device, comprising:
an array substrate including:
a plurality of gate lines and source lines to form pixels in a matrix;
a pixel electrode formed in each pixel and having a first pixel electrode portion extending in a first direction, and a second pixel electrode portion connected with the first pixel electrode portion and extending in the second direction orthogonally crossing the first direction;
a switching transistor having a gate electrode connected to the gate line extending in the second direction, a source electrode connected to the source line extending in the first direction and a drain electrode connected with the pixel electrode;
a counter substrate opposing to the array substrate and including a counter electrode having a first counter electrode portion arranged in parallel with the first pixel electrode portion; and
a liquid crystal layer held between the first and second substrates;
wherein a lateral electrical field generated between the first pixel electrode portion and the first counter electrode portion is applied to the liquid crystal layer, wherein the pixel electrode further includes a third pixel electrode portion connected with the first pixel electrode portion, and wherein the array substrate further includes a first auxiliary capacitance line and a second auxiliary capacitance line extending in the second direction, and the second pixel electrode portion and the third pixel electrode portion are arranged above the first and second auxiliary capacitance lines respectively, and
wherein the second pixel electrode portion is formed in the shape of Y with the first pixel electrode portion.

6. The liquid crystal display device according to claim 5, wherein the first counter electrode portion is arranged on the respective source lines at both sides of the first pixel electrode portion.

7. The liquid crystal display device according to claim 5, wherein the counter electrode further includes a second counter electrode portion extending in the second direction, the second counter electrode portion located above the third pixel electrode portion and connected with the first counter electrode portion.

8. The liquid crystal display device according to claim 5, wherein the third pixel electrode portion is formed in an octagon shape.

9. A liquid crystal display device, comprising:
an array substrate including:
a plurality of gate lines and source lines to form pixels in a matrix;
a pixel electrode formed in each pixel and having a first pixel electrode portion extending in a first direction, and a second pixel electrode portion connected with the first pixel electrode portion and extending in a second direction orthogonally crossing the first direction;
a switching transistor having a gate electrode connected with the gate line extending in the second direction, a source electrode connected with the source line extending in the first direction and a drain electrode connected with the pixel electrode;
a counter substrate opposing to the array substrate and including a counter electrode having a first counter electrode portion arranged in parallel with the first pixel electrode portion;
a liquid crystal layer held between the array substrate and the counter substrate;
a first alignment film formed on an internal surface of the array substrate, the internal surface contacting with the liquid crystal layer; and
a second alignment film formed on an internal surface of the counter substrate, the internal surface contacting with the liquid crystal layer;
wherein a rubbing treatment process is performed to the first and second alignment films so that a lateral electric field is generated between the first pixel electrode portion, the first counter electrode portion, wherein the pixel electrode further includes a third pixel electrode portion connected with the first pixel electrode portion and a second counter electrode portion extending in the second direction, the second counter electrode portion located above the third pixel electrode portion and connected with the first counter electrode portion, and wherein the array substrate further includes a first auxiliary capacitance line and a second auxiliary capacitance line extending in the second direction respectively, and the second pixel electrode portion and the third pixel electrode portion are arranged above the first and second auxiliary capacitance lines respectively, and wherein the second pixel electrode portion is formed in the shape of Y with the first pixel electrode portion.

10. The liquid crystal display device according to claim 9, each alignment film is formed of material which shows horizontal alignment characteristics.

11. The liquid crystal display device according to claim 9, further comprising a first polarizing plate and a second polarizing plate arranged on respective outer surfaces of the array substrate and the counter substrate, wherein the liquid crystal display device uses a linear polarization mode in which linearly polarized light selectively penetrates the polarizing plates and displays an image, and the first and second polarizing plates are arranged so that the respective absorption axis of the first and second polarizing plates cross at right angles.

12. The liquid crystal display device according to claim 11, wherein the liquid crystal display device uses a normally black mode.

13. The liquid crystal display device according to claim 9, wherein the first counter electrode portion is arranged on the respective source lines at both sides of the first pixel electrode portion.

* * * * *